(12) United States Patent
Piehler

(10) Patent No.: US 10,690,909 B2
(45) Date of Patent: *Jun. 23, 2020

(54) PROJECTION SYSTEM FOR DISPLAY APPLICATIONS

(71) Applicant: JABIL OPTICS GERMANY GMBH, Jena (DE)

(72) Inventor: Eberhard Piehler, Jena (DE)

(73) Assignee: Jabil Optics Germany GmbH, Jena (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/219,633

(22) Filed: Dec. 13, 2018

(65) Prior Publication Data

US 2019/0129164 A1    May 2, 2019

Related U.S. Application Data

(63) Continuation of application No. 15/400,625, filed on Jan. 6, 2017, now Pat. No. 10,185,143.

(30) Foreign Application Priority Data

Jan. 8, 2016  (DE) ..................... 10 2016 100 252

(51) Int. Cl.
G02B 27/00  (2006.01)
G02B 27/14  (2006.01)
(Continued)

(52) U.S. Cl.
CPC ......... *G02B 27/0025* (2013.01); *G02B 13/16* (2013.01); *G02B 13/18* (2013.01); *G02B 27/0101* (2013.01); *G03B 21/147* (2013.01); *G03B 21/208* (2013.01); *G02B 2027/011* (2013.01)

(58) Field of Classification Search
CPC .... G02B 27/0025; G02B 13/16; G02B 13/18; G02B 27/0101; G02B 2027/011; G03B 21/147; G03B 21/208
USPC ............... 359/433, 648, 649, 651, 637, 557; 353/81, 98–101
See application file for complete search history.

(56) References Cited

U.S. PATENT DOCUMENTS 2,354,614 A    7/1944  Reason
3,639,034 A    2/1972  La Russa
(Continued)

*Primary Examiner* — Thong Q Nguyen
(74) *Attorney, Agent, or Firm* — Young Basile Hanlon & MacFarlane, P.C.

(57) ABSTRACT

Described is a projection system for imaging an object into an image plane, including at least a first assembly group, a second assembly group and a third assembly group. Each of the assembly groups has at least one connected common optical axis (O1, O2, O3). A first assembly group comprises the object and a second assembly group comprises an optical component. At least two of the assembly groups are arranged tilted and/or staggered relative to each other. The optical axis (O3) of the image-side assembly group is inclined relative to the optical axis (OE) of the image (E) in the image plane. This provides a projection system from the imager to the intermediate image for a head-up display (HUD) with a tilted intermediate image plane with significantly reduced image field distortion and a dimensioning of the imaging optics adapted to the image field size for light weight and low costs.

11 Claims, 4 Drawing Sheets

(51) Int. Cl.
  *G02B 13/16* (2006.01)
  *G02B 13/18* (2006.01)
  *G02B 27/01* (2006.01)
  *G03B 21/14* (2006.01)
  *G03B 21/20* (2006.01)

(56) References Cited

U.S. PATENT DOCUMENTS

| | | | |
|---|---|---|---|
| 3,655,260 A | 4/1972 | Bartucci et al. | |
| 3,914,011 A | 10/1975 | Mallinson | |
| 3,972,584 A | 8/1976 | Lobb | |
| 3,985,422 A | 10/1976 | Mecklenborg | |
| 4,672,458 A | 6/1987 | McKechnie | |
| 4,753,519 A | 6/1988 | Miyatake | |
| 5,220,363 A | 6/1993 | Sato et al. | |
| 5,228,051 A | 7/1993 | Matthews | |
| 5,422,691 A | 6/1995 | Ninomiya et al. | |
| 5,499,139 A | 3/1996 | Chen | |
| 5,820,240 A | 10/1998 | Ohzawa | |
| 6,450,648 B1 | 9/2002 | Ohzawa et al. | |
| 6,527,394 B1 | 3/2003 | Lu | |
| 6,808,271 B1 * | 10/2004 | Kurematsu | G02B 5/1876 353/70 |
| 7,517,094 B2 | 4/2009 | Piehler | |
| 7,500,753 B2 | 10/2009 | Mueller | |
| 7,880,797 B2 | 2/2011 | Nanjo | |
| 8,427,745 B2 | 4/2013 | Doujou | |
| 8,662,675 B2 | 3/2014 | Destain | |
| 8,675,292 B2 * | 3/2014 | Wang | G02B 13/16 359/784 |
| 10,185,143 B2 * | 1/2019 | Piehler | G02B 27/0025 |
| 2006/0077567 A1 | 4/2006 | Matsuo | |
| 2006/0139581 A1 | 6/2006 | Piehler | |
| 2007/0014026 A1 | 1/2007 | Matsuoka | |
| 2009/0168031 A1 | 7/2009 | Imaoka | |
| 2010/0091249 A1 | 4/2010 | Benedix | |
| 2010/0309443 A1 | 12/2010 | Cheng | |
| 2013/0120720 A1 | 5/2013 | Helin | |
| 2015/0138047 A1 | 5/2015 | Hwang | |

* cited by examiner

PROJECTION SYSTEM FOR DISPLAY APPLICATIONS

CROSS REFERENCE TO RELATED APPLICATIONS

This application is a continuation of U.S. patent application Ser. No. 15/400,625, filed Jan. 6, 2017, now U.S. Pat. No. 10,185,143, which claims priority to German Patent Application No. 102016100252.6 filed Jan. 8, 2016, which are incorporated by reference as if fully set forth.

FIELD OF INVENTION

The present invention discloses a projection system for display applications. In particular, the invention discloses the design of a projection system from the imager to the intermediate image for a head-up display (HUD) with a tilted intermediate image plane with, compared to state of the art, significantly reduced image field distortion and a dimensioning of the imaging optics adapted to the image field size for light weight and low costs.

BACKGROUND

The displaying of information for the driver of a motor vehicle, which must be currently provided to the driver, is becoming more and more important as the increasing internal networking (GPS, map data, current traffic situation, . . . ) and the installation of more and more sensors into the vehicle cause considerable amounts of data incurring for evaluation. Therefore, a display should be carried out in such a way that the driver can still keep an eye on the current traffic situation. HUD systems have proved to be particularly favorable for these tasks.

There are HUD systems with LCD displays for image generation and systems in which a micro display, for example comprising a Digital Micromirror Device (DMD), is imaged onto an intermediate image plane. This intermediate image can then be made available to the driver using a further optical system.

The design of the entire imaging channel (imager, intermediate image, virtual image for the driver) requires a tilting of the generated intermediate image in order to avoid reflections from the sun or other intense light sources. In order to provide an efficient integrated system, however, the projection system from the imager to the intermediate image requires a tilting of the intermediate image plane. Usually, such a tilting results in a plane which is inclined by at least 10 degrees to a main plane lying perpendicular to the beam axis. The beam axis as well as the tilting axis are each passing through the image center and intersecting each other perpendicularly.

In order to realize such a tilting of the intermediate image plane, different approaches are found in the state of the art. For example, such a tilting can be achieved by applying the Scheimpflug principle taking into account the so-called Scheimpflug condition. This means that an object plane with maximum sharpness is imaged in an image plane when the object plane, the main plane of the objective and the image plane intersect in a common straight line. Thus, in result of a corresponding tilting of the object (imager) and image (intermediate image plane), a tilted image with maximum sharpness can be realized. However, this option has the disadvantage that often a considerable distortion of the image field occurs. As a result, particularly in the case of high-resolution imagers with high information density, artifacts which are clearly visible can occur. The distortion has a further effect on a different resolution in the different image regions and leads to a strong inhomogeneity in the brightness of the image field. A further possibility for tilting the intermediate image plane is an off-axial use of the applied imaging optics, so that a corresponding tilting is realized especially for the center of the used image field. This option, however, has the disadvantage that the optics therefore have to be designed for a significantly larger image field and thus the projection system becomes considerably more expensive and heavier than necessary for purely optical reasons.

The objective problem of the invention is therefore to provide an improved projection system for display applications which avoids or at least significantly reduces one or more of the problems narrated in the state of the art. In particular, an objective problem of the invention is to provide a projection system from the imager to the intermediate image for a HUD with a tilted intermediate image plane with, compared to state of the art, significantly reduced image field distortion and a dimensioning of the imaging optics adapted to the image field size for light weight and low costs.

SUMMARY

The invention provides a projection system for imaging an object into an image plane. The projection system comprises at least three assembly groups: a first assembly group, a second assembly group and a third assembly group, wherein each of the present assembly groups has at least one connected common optical axis, and wherein the first assembly group comprises the object and the second assembly group comprises an optical component. The projection system according to the invention is characterized in that at least two of the assembly groups are arranged tilted and/or staggered relative to each other, and the optical axis of the image-side assembly group is inclined relative to the optical axis of the image in the image plane.

Further advantageous embodiments of the invention result from the further features specified in the individual sub-claims. The various embodiments of the invention mentioned in this application are advantageously combinable with one another, unless otherwise stated in the individual case. Both the foregoing general summary and the following detailed description are given by way of example and are intended to illustrate the claimed invention. Further advantages and features of the invention are apparent from the following description, the drawings and the patent claims.

BRIEF DESCRIPTION OF THE DRAWINGS

The invention is explained below in exemplary embodiments based on the accompanying drawings. In particular.

DETAILED DESCRIPTION

Figure 1:
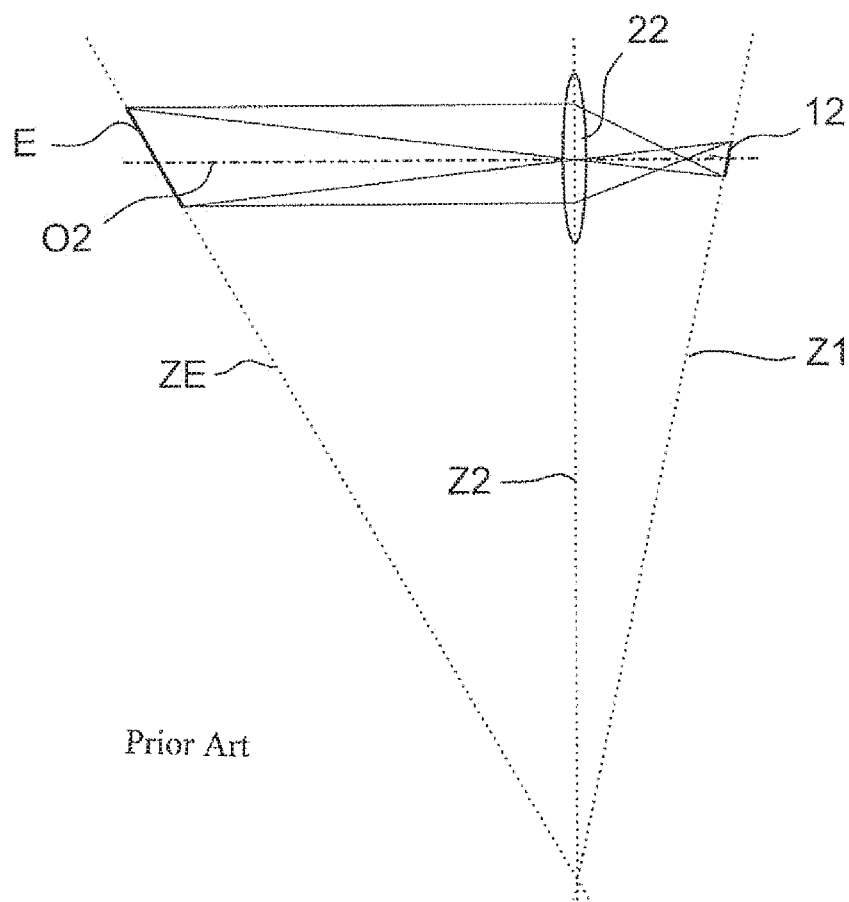
FIG. 1 is a schematic representation of the Scheimpflug condition.

The projection system comprises at least three assembly groups: a first assembly group, a second assembly group and a third assembly group, wherein each of the present assembly groups has at least one connected common optical axis, and wherein the first assembly group comprises the object and the second assembly group comprises an optical component. The projection system according to the invention is characterized in that at least two of the assembly groups are arranged tilted and/or staggered relative to each other, and the optical axis of the image-side assembly group is inclined relative to the optical axis of the image in the image plane. In particular, the intermediate image for a HUD may be in the inclined image plane. The projection system according to the invention can, for example, represent the part of a HUD imaging channel, which is located between an imager which displays the object to be imaged and an intermediate image, which is sharply imaged within the intermediate image plane.

The projection system according to the invention can comprise at least three assembly groups, wherein the individual assembly groups can differ from each other by the spatial position of their respective optical axis. In particular, the optical axis of an assembly group means the axis along which the optical image of an object within the optical path of the image of said assembly group takes place. For imaging purposes, in most cases rotationally symmetrical optics are used. In general, the symmetry axis of an individual optical component or a complete optical assembly group is referred to as the optical axis. The optical axis is typically perpendicular to the main plane or to the (parallel) main planes of an optical assembly group. If several optical components are arranged in a row and can be described by at least one of such connected common optical axis, these components can be combined to form one common assembly group. In the case of non-sequential optical paths, however, further distinguished beam axes may be present between the individual components of the assembly group. Generally these are not used for imaging the object into an image plane but, for example, for illuminating the object or for monitoring the imager. In result, such additional beam axes do not represent optical axes in the sense of disassembling an assembly group.

The first assembly group comprises an object and all optical components having a connected common optical axis with this object. The object can thereby be generated dynamically, for example by a transmitting or reflecting imager, for example an LCD or DMD, or can also be present as a static object which can be switched on or off by means of a corresponding illumination.

Additional optical components of the first assembly group would therefore be, for example, a light source located on the optical axis of the first assembly group, a correspondingly designed indirect illumination system or an optical window for anti-reflection or spectral filtering.

The second assembly group comprises an optical component which can be used to image the object of the first assembly group. The optical component can be, for example, a simple spherical or aspherical lens element or a complex lens system. In particular, this can also be an apochromatic lens system for correcting color aberrations occurring during imaging.

According to the invention, at least two of the at least three assembly groups are tilted and/or staggered relative to each other. The position of the image plane is variable and defined by the sharp image of the object. However, the image plane is completely defined by the projection system used. In particular, a projection can be generated in which the projection path is inclined relative to the optical axis of the image-side assembly group, meaning the assembly group which is functionally located directly before the image plane in the optical path of the projection system, and relative to the optical axis of the image in the resulting image plane of the projection. Through this can be achieved, that the image plane, meaning the plane into which the object is sharply imaged, is inclined to the remaining assembly groups or, respectively, to the, through the individual optical axes of this assembly group, distinguished direction of the main axis of the imaging optical path of the projection system according to the invention. Particular preference is given to an arrangement in which the object plane and the image plane are tilted against each other, meaning not parallel to each other, and the planes therefore include a corresponding tilt angle. Particularly preferred are tilt angles of greater than 5 degrees, greater than 10 degrees, greater than 15 degrees, greater than 20 degrees and greater than 25 degrees.

The invention is based on the knowledge that by integrating at least one further assembly group into a general single-axis projection system, meaning a projection system without tilting of the image plane, tilting of the image plane can be achieved. According to Scheimpflug a clear reduction of the associated image field distortion can be achieved compared to a conventional projection arrangement for tilting the image plane. This additional assembly group can be tilted and/or staggered relative to at least one further assembly group in such a way that the aberrations occurring in the projection system at least partially compensate one another. In particular, the invention is based on the knowledge that, in the case of an appropriate arrangement of the assembly groups, the disadvantages of the two mentioned methods (regarding the state of the art) of image field tilting, meaning application of the Scheimpflug condition and the off-axial use of the imaging optics, can advantageously be combined with one another in such a way that the resulting disadvantages can be avoided.

In other words, the off-axis use of only one or individual assembly groups with oblique incidence enables to largely avoid the aberrations occurring when the Scheimpflug condition is applied. Particularly preferred is the reduction of a keystone distortion resulting from the Scheimpflug condition by at least 10%, 20% and 50%.

In an advantageous embodiment of the invention, it is provided that the optical axes of the mutually tilted assembly groups can be transferred into one another by rotation about a tilt axis belonging to a pair of mutually tilted assembly groups and subsequently spatially shifted perpendicularly to the tilt axis, wherein the tilt axis perpendicularly intersects the optical axis of one of the two assembly groups. The tilt axis can preferably be defined individually for each assembly group via the intersection of the optical axis of this assembly group with the corresponding main plane of the assembly group. Since, according to the invention, an assembly group is designated by a commonly connected optical axis, a corresponding tilting axis can also be determined as the arithmetic mean of the resulting intersections, also in the case of an assembly with several main planes. In general, however, it can be assumed that the tilt axis of an assembly group is located at the center of the respective assembly group. In the case of an assembly group which comprises exactly one thin single lens, the preferred tilting axis is therefore located in the center of the lens, meaning precisely at the point where, in the case of a geometric imaging construction, the center beams of the image intersect each other and intersect with the optical axis of this assembly group. This embodiment describes a projection system according to the invention in which the tilting and/or shifting of the individual assembly groups relative to each other takes place within a common plane. Therefore, the optical axes of both assembly groups, meaning the assembly group which is tilted/shifted and unchanged in its position, are located within a common plane. In particular, in the case of a projection system with three assembly groups, in which only one assembly group is tilted and/or shifted relative to the two other assembly groups, the optical axes of all assembly groups are preferably located within one plane.

In a further advantageous embodiment of the invention, the object is a reflective imager which is illuminated and imaged by an object-side assembly group, meaning the assembly group which is functionally located directly before the object in the optical path of the projection system, wherein this assembly group is tilted and/or staggered relative to the other assembly groups. In this exemplary embodiment, it can particularly be an object-side assembly group, which has at least a plurality of beam axes in partial regions. In particular, the illumination system and the imaging system of this assembly group can have two different optical paths. This can be used in particular for the organization of a particularly compact, space-saving and efficient imaging system.

In this embodiment, the imager can additionally be tilted and/or staggered relative to this group. In this case, the assembly group used for illumination and imaging and the imager used are tilted and/or staggered relative to the rest of the system.

In a further advantageous embodiment of the invention, the object-side assembly group comprises exactly one lens element. It is particularly preferred that at least one of the surfaces of the lens element is aspherically formed.

In a particularly advantageous embodiment of the invention, it is provided that the optical axis of an assembly group, lying in front of the object in the optical path of the projection system, is inclined and/or shifted to the optical axis of the image in the image plane.

In a further advantageous embodiment of the invention it is provided that the projection system according to the invention as a further assembly group comprises an illumination optics with a pupil. This illumination optics can be designed as part of the projection optical path or serve as an additional assembly group outside the projection optical path for illuminating the object. In particular, the illumination optics can be characterized in that a light field adapted to the projection optical path can be generated by means of the integrated pupil. Depending on the light source used, the illumination optics may contain a tool for homogenizing the illumination in the section of the pupil. This tool for homogenization can, for example, be a honeycomb element or a scattering disc. The additional assembly group with the illumination optics can be arranged both within the tilting or shifting plane, as well as in any other plane, which preferably forms an angle of 90° with respect to the aforementioned plane.

In a further advantageous embodiment of the invention, it is provided that a focusing of the image takes place via a first region spaced apart with air between the individual assembly groups. It is particularly advantageous if the first region is located between two assembly groups which are tilted and/or staggered relative to each other. However, it is also possible for the first region to be spaced apart with any other medium, for example nitrogen ($N_2$), argon (Ar) or helium (He) as inert gases, instead of air.

In a further advantageous embodiment of the invention, it is provided that an enlarged image size range can be covered by a second region with variable distance. In particular, this corresponds to an optical image with a variable magnification, so that the size of the image can thus be set variably. Furthermore, it is advantageous that the variable distance can be achieved by means of extension tubes of different widths as fixedly designated spacers. This enables, in particular, a fixed, but individually selectable presetting of a specific image size of the projection system.

FIG. 1 shows a schematic representation of the Scheimpflug condition. An object 12 in an object plane Z1 is imaged as an image E in an image plane ZE by an imaging optical component 22, for example a single lens or a lens. The optical component 22 is assumed to be rotationally symmetrical with respect to its optical axis O2. If the object plane Z1 or the image plane ZE is tilted relative to the optical axis O2 in such an image, the mutual position of the object plane Z1, the objective plane Z2 and the image plane ZE can be determined by means of the Scheimpflug principle so that a sharp image of the object 12 over the entire image field is given. According to the Scheimpflug condition, this is exactly the case if in such an arrangement object plane Z1, objective plane Z2 and image plane ZE intersect precisely in a common straight line in space. In the view shown, this intersecting line extends perpendicularly out of the drawing plane and is therefore only recognizable as a common intersection point. The distance between the individual components along the optical axis O2 results from the focal length of the imaging optical component 22 and largely corresponds to the object or image range in the case of a non-tilted imaging system.

In the optical arrangement shown, which corresponds to the Scheimpflug condition, an object-side point is also imaged on the optical axis O2 of the optical component 22 on the image side as a point on the optical axis O2. In the illustration, the center of the object 12 lies precisely at the height of the optical axis O2. The construction of the optical path of the beams originating from the object 12 clearly shows that a distortion occurs in the image of the object 12 due to the mutual tilting of the object plane Z1 and the image plane ZE. In this case, the image parts entering the image side above the optical axis O2 are over-stretched, while the image parts entering below the optical axis O2 are compressed. The center of the image E and the center of the image field are thus increasingly differentiated with increasing tilting. The image field center is thus located outside the optical axis O2 and the entire image field is shifted accordingly. In such an image, therefore, it is necessary to distinguish precisely between the image center (image point of a point on the optical axis of the object 12) and the center of the image field (point on the optical axis of the image E). The point on the object side on the axis is imaged on an image point on the axis, but it is not centered on the extended image field for a symmetrically extended object field. If the object 12 is a rectangle, considering the Scheimpflug condition, a sharp image of the object 12, which is sharp in the entire image plane, is obtained, but the image E has a keystone distortion. In this case, the image field is shifted with respect to the optical axis O2 and thus with respect to the center of the object 12.

Figure 2:
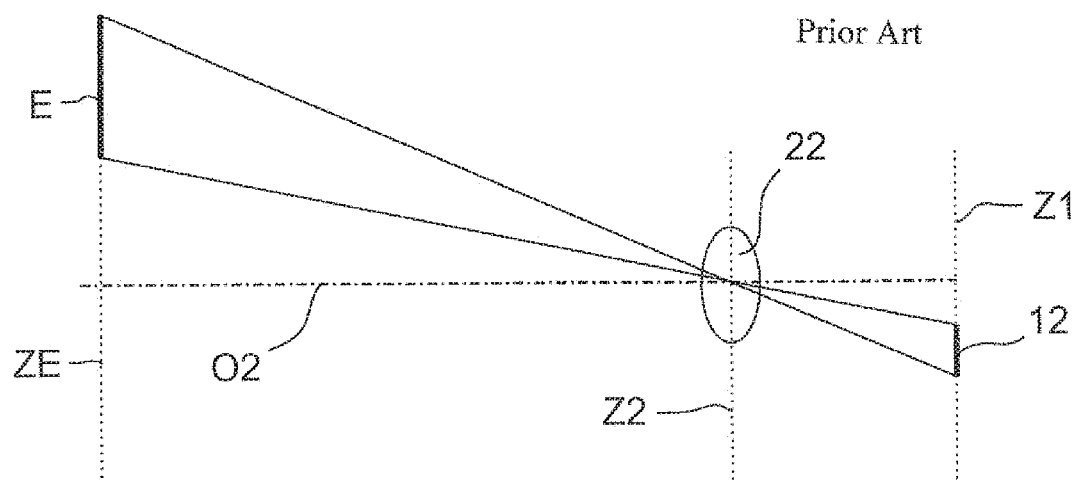
FIG. 2 is a schematic representation of an optical arrangement for dislocating the image field.

FIG. 2 shows a schematic representation of an optical arrangement to dislocate the image field. The indicated optical component 22 is assumed to be rotationally symmetrical with respect to its optical axis O2. There is no tilting of the object plane Z1 or of the image plane ZE, so the object plane Z1, the objective plane Z2 and the image plane ZE are parallel to one another. However in this case, the object 12 is not located on the optical axis O2 of the imaging optical component 22 but has been shifted downwards with respect to the optical axis O2. This results in an image-side shifting of the image E of the object 12. Accordingly, a targeted shifting of the image field within the image plane ZE can be achieved by means of the indicated arrangement corresponding to the magnification factor of the optical system. Geometrical distortions do not occur. A rectangle as object 12 is therefore also imaged as a rectangle in the image E. Therefore, with such an optical arrangement, a shifting of the image field generated, according to the Scheimpflug condition by tilting an imaging optical component 22, can be compensated. However, a compensation of a keystone distortion of the image E occurring during the application of the Scheimpflug condition cannot be achieved. An example of a conventional optical imaging system which allows the Scheimpflug condition to be taken into account, when the image plane ZE is tilted and in which the optical axis O2 of the optical component 22 can be shifted in relation to the image field, are the so-called tilt-shift lenses. The maximum possible shifting of the image E is thereby essentially limited by the aperture of the objective.

Figure 3:
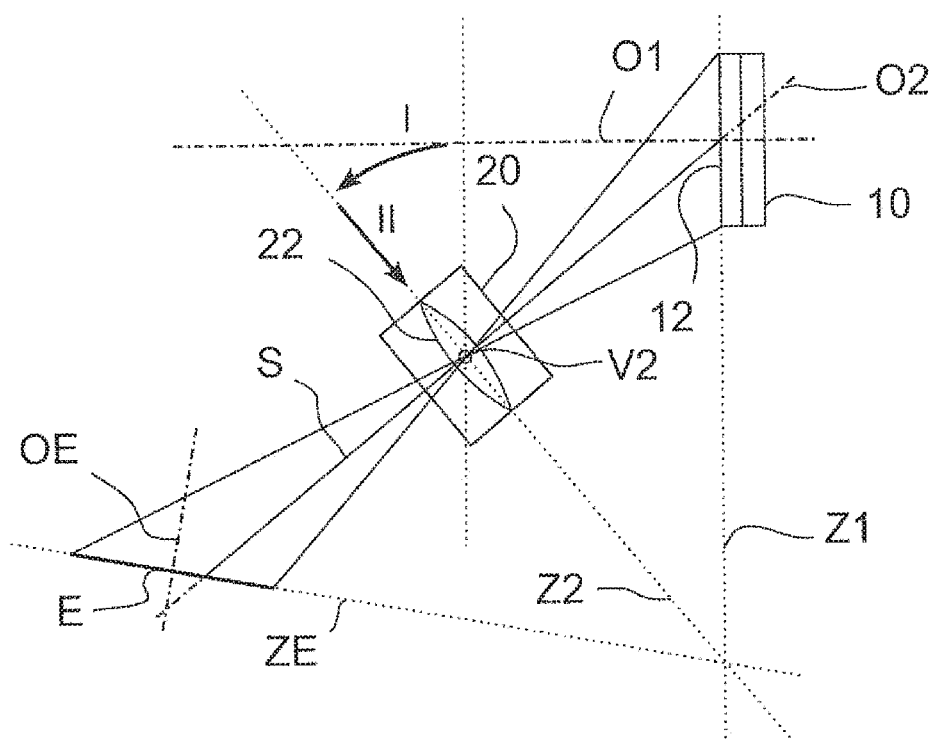
FIG. 3 is a schematic representation of a conventional projection system for generating a tilted image according to Scheimpflug.

FIG. 3 shows a schematic representation of a conventional projection system for generating a tilted image according to Scheimpflug. The projection system shown has two assembly groups: a first assembly group 10 and a second assembly group 20. The location of the first assembly group 10 is characterized by a distinguished optical axis O1. The first assembly group 10 comprises an object 12, for example a liquid crystal-based imager with two-dimensional background illumination. The illustrated second assembly group 20 also has a distinguished optical axis O2 regarding its position. The second assembly group 20 serves to image the object 12 into an image plane ZE and comprises an imaging optical component 22. The optical component 22 can be, in particular, a single lens element or a lens system. Furthermore, the illustration shows an image E with an optical axis OE in an image plane ZE, wherein the optical axis OE is located in the center of the image field. However, due to the image distortion occurring, the center of the image E is at a different position. Within the image plane ZE, a distorted real image E of the object 12 is generated by optical imaging in the image field in complete analogy to FIG. 1. The illustrated projection system fulfills the Scheimpflug condition. The first assembly group 10 and the second assembly group 20 are therefore arranged behind one another, in a way that their respective main planes, meaning the object plane Z1 and the objective plane Z2, intersect with the image plane ZE in a common straight line. In the view shown, only the common intersection point can be perceived. By means of such an arrangement, a real image of the object 12, which is sharp over the entire image field of the image E, can be generated from the object plane Z1 in the image plane ZE. The occurring distances between the individual assembly groups or the image plane ZE are designated by the focal length of the optical component 22 used of the second assembly group 20.

In contrast to the general representation of the Scheimpflug condition as shown in FIG. 1, a tilted image of the object 12 is generated from a fixed object plane in accordance with a technical application of the present invention. In this illustration, the position of the occurring optical axes is also indicated. To illustrate the optical path of the tilted image, the pathway of the central beam along the beam axis S of the object 12 to the image E is also shown. In order to get from a general one-axial projection system without tilting the image plane or object plane to the configuration shown here, a rotation I of the second assembly group 20 with respect to the optical axis O1 can take place first, followed by a shifting II of the second assembly group 20 within the drawing plane. Subsequently, according to the Scheimpflug principle, the position of the image plane ZE can be determined. This is therefore an optical arrangement which comprises a first assembly group 10 and a second assembly group 20, wherein the optical axis O1 of the first assembly group 10 and the optical axis O2 of the second assembly group 20 in the drawing plane can be transferred into one another by rotation I by a tilting axis, belonging to the second assembly group 20, and subsequent spatial shifting II.

The shown angular relationships in this and in the following figures are solely for the purpose of illustrating mutual positional relationships and do not represent a restriction of the general validity. In particular, no advantageous embodiments can be derived therefrom. An essential disadvantage of the projection system shown in FIG. 3 for generating a tilted image according to Scheimpflug is the occurrence of a strong image field distortion due to the mutual tilting of the assembly groups relative to each other. If the object 12 is, for example, a simple rectangle, its image E is typically distorted into a trapezoid. The effects of such an image field distortion can, for example, be taken from FIG. 7. There, the image field distortion of a conventional projection system for generating a tilted image according to Scheimpflug is compared with an image field distortion of a projection system according to the invention for generating a tilted image. As a result of the tilting, further aberrations are generated in addition to existing aberrations of the optical component 12, for whose correction the Scheimpflug condition does not provide any indications.

Figure 4:
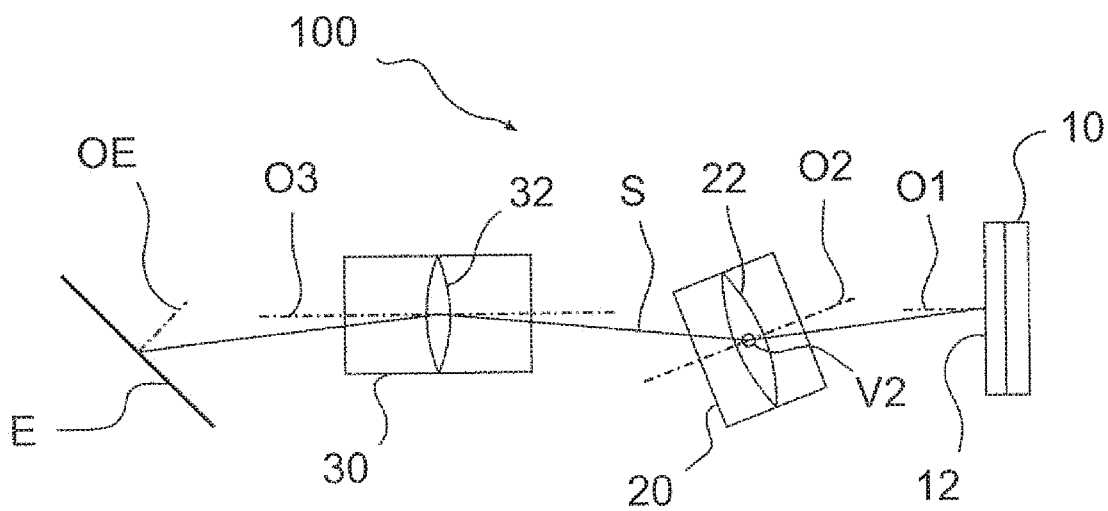
FIG. 4 shows a schematic representation of a projection system according to the invention for generating a tilted image.

FIG. 4 shows a schematic representation of a projection system 100 according to the invention for generating a tilted image. The projection system indicated has three assembly groups: a first assembly group 10, a second assembly group 20, and a third assembly group 30. The first assembly group 10 is characterized by a distinguished optical axis O1. The first assembly group 10 comprises an object 12, for example produced by a liquid crystal-based imager with two-dimensional background illumination. The illustrated second assembly group 20 also has a distinguished optical axis O2 and, in particular, represents an optical component 22. The optical component 22 can be, for example, a simple spherical or aspherical lens element or a complex lens system. In particular, this can also be an apochromatic lens system for correcting color aberrations occurring during imaging. The third assembly group 30 shown also has a distinguished optical axis O3. The third assembly group 30 can preferably be an objective 32. In particular, the objective 32 can also be the main objective which is mainly responsible for the actual imaging. This can be, for example, a simple spherical or aspherical lens element or a complex lens system. In particular, this can also be an apochromatic lens system for correcting color aberrations occurring during imaging. Furthermore, an image E with an optical axis OE is indicated. A real image of the object 12 is generated within the image plane ZE by optical imaging.

As can be seen in the illustration, the three assembly groups are arranged one behind the other, wherein in particular the optical axis O1 of the first assembly group 10 and the optical axis O3 of the third assembly group 30 lying at the same level and thus being located on a common straight line. The second assembly group 20, on the other hand, is tilted and staggered relative to the first assembly group 10 as well as relative to the third assembly group 30. As a result, the optical axis O2 of the second assembly group 20 deviates from the common direction of the optical axes O1 of the first assembly group 10 and the optical axis O3 of the third assembly group 30. In the exemplary embodiment shown, the optical axis O2 of the second assembly 20 can, for example, be transferred to the optical axis O1 of the first assembly 10 by rotation about the tilt axis V2 and subsequent spatial shifting perpendicular to the tilt axis V2, wherein the tilt axis V2 intersects the optical axis O2 of the second assembly 20 perpendicularly. This causes rotation and shifting of the assembly group within a plane (drawing plane) which is defined in particular by the optical axes of the individual assembly groups. According to the invention, the optical axis O3 of the image-side assembly group 30 is inclined relative to the optical axis OE of the image E in the image plane ZE. The three assembly groups arranged behind one another thus form a substantially linearly arranged projection system in which the optical axis O1 of the first assembly group 10 is tilted in the direction of the optical axis OE of the image E in the image plane ZE. In order to illustrate the optical path of the projection system, the pathway of the center beam along the beam axis S from the object 12 to the image E is shown.

Also with this schematic representation, no advantageous embodiments can be derived from the angles and distances shown. The illustration is only intended to illustrate the general arrangement of the assembly groups and in particular does not represent a scaled basis for a technical and functional implementation of the projection arrangement. However, it can be extracted from the figure that in the schematic representation of projection system according to the invention for generating a tilted image by implementation of an additional optical component, in contrast to the projection system shown in FIG. 1, a tilting of the image plane can also be achieved. In particular, the tilted and dislocated arrangement of the second assembly group 20, relative to the first assembly group 10 and to the third assembly group 30, ensures that an otherwise occurring image distortion can be effectively suppressed.

Figure 5:
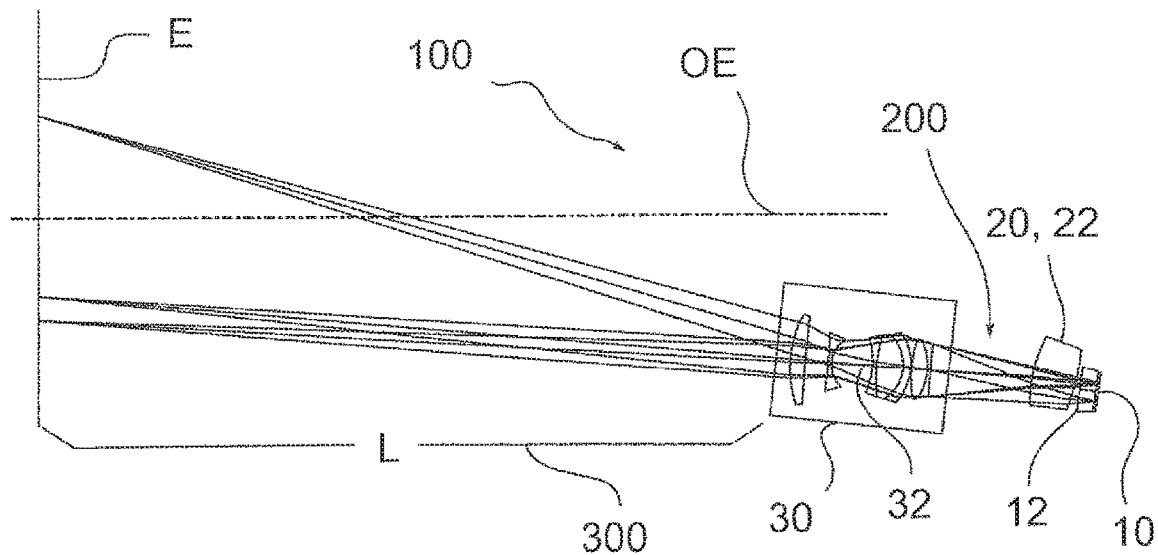
FIG. 5 shows a numerical simulation of the optical path for 3 field points of a particularly advantageous embodiment of a projection system according to the invention.

FIG. 5 shows a numerical simulation of the optical path for 3 field points of a particularly advantageous embodiment of a projection system according to the invention. The basic design of the illustrated system largely corresponds to the schematic design shown in FIG. 4. In particular, this is a projection system with three assembly groups. Correspondingly, the respective reference signs can also be assigned to the individual assembly groups. In particular, the optical component 22 of the second assembly group 20 is an aspherical single lens which is arranged tilted and staggered relative to the first assembly group 10 and to the third assembly group 30. The third assembly 30 is an objective 32, which is designed as a complex lens system. As shown by the illustrated optical paths of the individual main beams, the actual imaging performance is performed by the third assembly group 30, while the second assembly group 20 essentially contributes to the tilting of the image by means of an off-axis use in the case of oblique incidence. In a special case, the optical axes O1, O3 of the first assembly group 10 and of the second assembly group 30 can be located on a common line. However, as is the case in the example, it may be necessary for the projection system for further correction of aberrations, that the objective 32 of the third assembly group 30 still has to be adapted to the beam guidance modified by the second assembly group 20. The lens system 32 of the third assembly group 30 can particularly preferred be a projection lens 32 with a variable distance L. In particular, as in the present exemplary embodiment, it can be a projection system in which the focusing of the image takes place via a first region 200 spaced apart with air between the first assembly group 10 and the second assembly group 20. In the illustration shown, this first region 200 is located between two assembly groups which are tilted and/or staggered relative to each other. By means of a second region 300 with said variable distance L, an enlarged image size range can be covered. The variable distance L can in particular be variable and freely adjustable or can be provided by the use of differently wide extension tubes as fixed spacers for the substantially one-time adjustment of the distance of variable length L. The properties of the design shown and the advantages resulting therefrom, compared to state of the art, can be obtained analogous of the description of FIG. 4.

Figure 6:
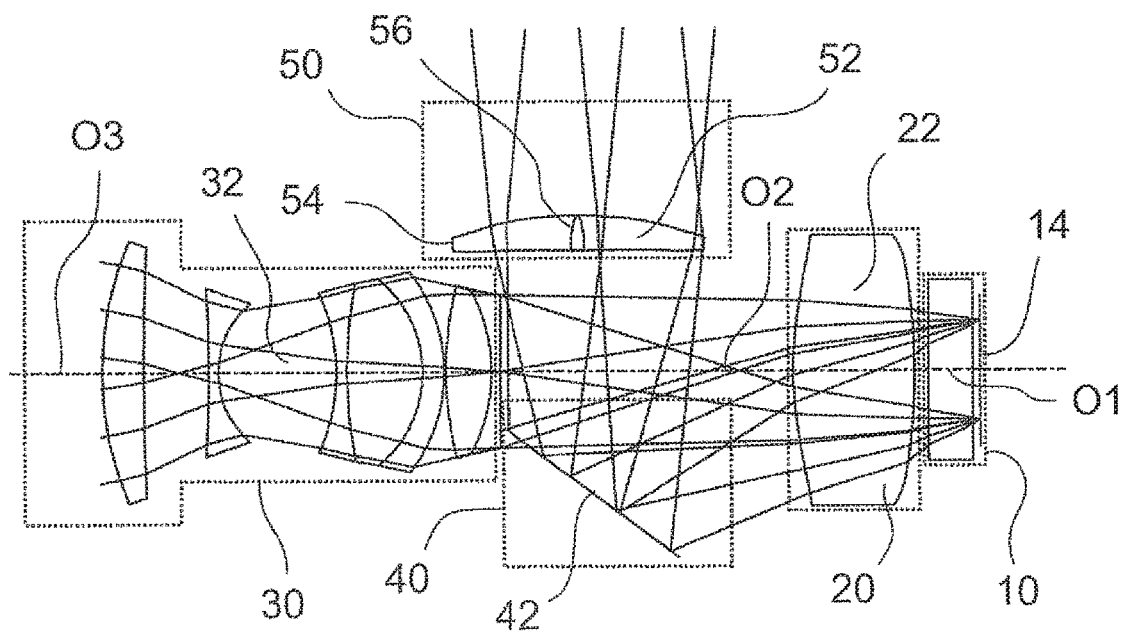
FIG. 6 shows a numerical simulation of the outer field points of the optical path of the embodiment of a projection system according to FIG. 5 with illumination optics and a reflective imager.

FIG. 6 shows a numerical simulation of the outer field points of the optical path of the embodiment of a projection system according to the invention according to FIG. 5 with illumination optics 52 and a reflecting imager 14. In particular, this is a view rotated by 90 degrees of a part of the optical path shown in FIG. 5. The basic design of the illustrated projection system corresponds to the schematic design according to FIG. 4 or the numerical simulation according to FIG. 5. The associated reference signs apply correspondingly. The representation is supplemented by a fourth assembly group 40, which comprises a mirror 42, and a fifth assembly group 50, which particularly comprises an illumination optics. For example, the imager 14 used for the imaging of the object 12 is a reflecting imager 14, therefore it must be illuminated from the front in order to enable imaging. In particular, in the exemplary embodiment illustrated, the imager 14 is illuminated by the object-side second assembly group 20 and simultaneously imaged. In this case, the second assembly group 20 can be, analogously to the above exemplary embodiments, arranged tilted and staggered relative to the two other assembly groups of the imaging optical path, meaning the first assembly group 10 and the third assembly group 30. In the illustration shown in FIG. 5, a corresponding tilting or a dislocation of the imaging assembly groups is present only in the display plane shown in FIG. 5. Thus in the illustration shown in FIG. 6 the optical axis O1 of the first assembly group 10, the optical axis O2 of the second assembly group 20, and the optical axis O3 of the third assembly group lie on a common straight line. Irrespective of this, however, a tilting and/or dislocation of individual assembly groups according to the invention can also be realized in this spatial plane. The illumination optics 52 shown in FIG. 6 could therefore also be integrated in the plane view shown in FIG. 5. A tilting and/or dislocation of individual assembly groups according to the invention can be present with respect to a single spatial plane or also in a plurality of spatial planes. An illumination optics 52 can also be integrated via one or more spatial planes. The said planes of tilting and/or dislocation of individual assembly groups may coincide with said planes of the integration of an illumination optics 52 or the said planes of tilting and/or dislocation of individual assembly groups differ from said planes of the integration of an illumination optics 52. In the embodiment shown in FIG. 6, the image is performed by a single lens element as an optical component 22. Furthermore, illumination of the imager 14 is performed by the optical component 22. The illumination optical path is thereby overlapped via a mirror 42 of the fourth assembly group 40 which, in this exemplary embodiment, is located between and tilted and staggered relative to the first assembly group 10 and the third assembly group 30, by the projection optical path. The shown fifth assembly group 50 with the illumination optics 52 can in particular be arranged and designed in such a way that, via the mirror 42 of the fourth assembly group 40, the illumination of the imager 14 is as homogeneous as possible. It is particularly advantageous that the illumination optical system 52 is provided with a pupil 54 for the spatial narrowing of the illumination optical path, and, if required, a homogenization of the illumination by a correspondingly designed honeycomb element 56 can take place in the region of the pupil 54. This can lead to a considerable improvement of the imaging properties, particularly in the case of non-homogeneously radiating illumination sources and inadequately designed panel radiators. In particular, in addition to the most homogeneous illumination of the imager 14, general shadowing and over-illumination effects can be effectively suppressed.

Figure 7:
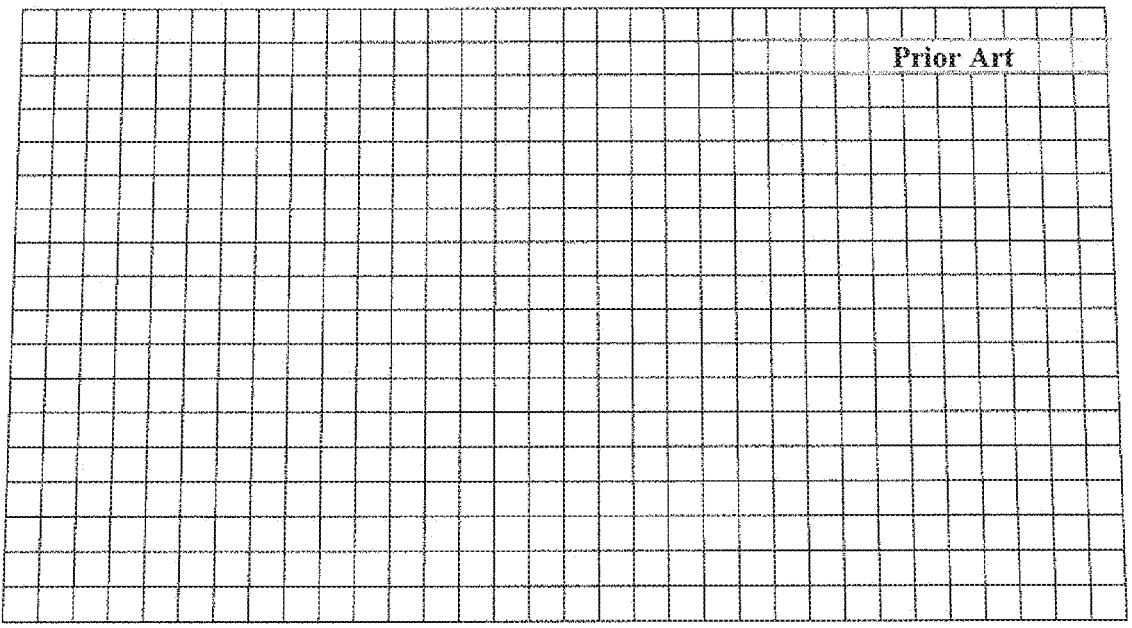
FIG. 7 shows exemplary distortion grids in an enlarged image of an object field on an image field using a conventional projection system for generating a tilted image according to Scheimpflug and a projection system according to the invention.
Figure 7:
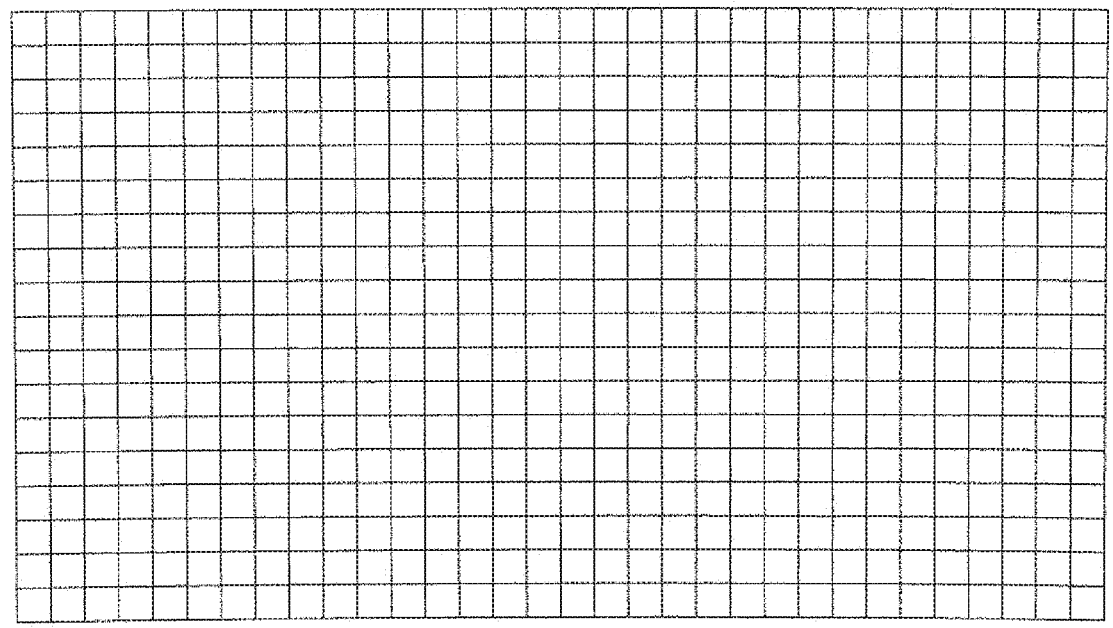

FIG. 7 shows exemplary distortion grids in an enlarged imaging of an object field on an image field using a conventional projection system for generating a tilted image according to Scheimpflug and a projection system according to the invention according to FIGS. 5 and 6. In particular, the numerically calculated distortion grids show the enlarged image of a grasped object field into a corresponding image plane. For the illustration of the distortion grid of a tilted image according to Scheimpflug, a design was used in which the image-side tilting in the center of the image field is 10 degrees and the imaging scale is from object to image 1:10. These imaging properties apply correspondingly to the illustration of the distortion grid of the projection system according to the invention. The lower distortion of the projection system according to the invention compared to a conventional projection system for generating a tilted image according to Scheimpflug is clearly recognizable by the deformation of the originally regular object grid. A specific measure for the occurring distortion is the relative difference between a specific geometric actual value and a specific setpoint in the generated image. Generally the distortion of a projection system is highly location-dependent and increases in particular with an increasing distance from the image center or from the optical axis to the outer image edge. A reduction of the occurring distortion by a certain percentage amount is therefore exactly the case if the corresponding distortion curves in the meridional and sagittal directions lie on average by this percentage amount below the reference curve of a conventional projection system for generating a tilted image according to Scheimpflug.

Table 1 shows a list of lens parameters obtained by numerical simulation with a beam propagation software for designing a projection system according to the invention described in the exemplary embodiments. In particular, the two exemplary embodiments described in FIGS. 5 and 6 lie in planes of a single projection system with a 90 degree angle relative to each other. A DMD with a resolution of (854×480) pixels and a pixel distance of 7.637 µm was selected as imager. The generated image field is (6.572× 3.699) mm with a transmission length of 202 mm. The therefore achieved tilting in the center of the image field is 10.1 degrees. The image field to the optical axis of the front part of the projection optical system is tilted by approximately 5 degrees. In this arrangement, nine different optical elements are combined with one another, wherein the projection system is defined by the radii of curvature of mutually facing surfaces and their mutual distances. Furthermore, two of the described optical elements are aspherical lenses which are defined by the lens parameters and the corresponding aspheric equation given below in Table 1.

Table 2 shows the corresponding transformations relating to the shifting and rotation of the individual assembly groups for the projection system according to the invention described in Table 1.

TABLE 1

| | Radii | | Distance or Thickness | | Refractive Index $n_e$ | | Abbe Number $v_e$ |
|---|---|---|---|---|---|---|---|
| object | infinite | | t1 | n1 = | 1.85694 | v1 = | 29.82 |
| R1 = | 21.99 | d1 = | 2.78 | n2 = | 1.59911 | v2 = | 38.97 |
| R2 = | 192.0 | d2 = | 4.37 | n3 = | 1.51911 | v3 = | 52.14 |
| R3 = | −77.52 | d3 = | 0.61 | n4 = | 1.77621 | v4 = | 49.43 |
| R4 = | 5.9 | d4 = | 7.946 | n5 = | 1.83932 | v5 = | 36.92 |
| R5 = | −12.78 | d5 = | 0.67 | n6 = | 1.71615 | v6 = | 53.64 |
| R6 = | 31.16 | d6 = | 55.08 | n7 = | 1.85649 | v7 = | 32.03 |
| R7 = | −7.959 | d7 = | 1.46 | n8 = | 1.65425 | v8 = | 58.30 |
| R8 = | −10.74 | d8 = | 0.1 | n9 = | 1.48914 | v9 = | 50.23 |
| R9 = | 23.17 | d9 = | 3.13 | | | | |
| R10 = | −11.01 | d10 = | 0.56 | | | | |
| R11 = | 787.7 | | t2 | | | | |
| A1 R12 = | 22.92 | d12 = | 8.2 | | | | |
| A2 R13 = | −42.256 | | t3 | | | | |
| R14 = | infinite | d14 = | 2.999 | | | | |
| R15 = | infinite | d15 = | 0.483 | | | | |
| R16 = | infinite | | | | | | |

| Aspheres | A1 | A2 |
|---|---|---|
| k = | −3.27 | −4.314 |
| c2 = | −4.959E−05 | −5.068E−05 |
| c3 = | 2.018E−07 | 2.803E−06 |

TABLE 1-continued

| | | |
|---|---|---|
| c4 = | −3.76E−09 | −3.95E−08 |
| Aspherical equation | $z = (h^2/R)/(1 + (1 - (1 + k)*(h/R)^2)^{1/2}) + \Sigma c(i)*h^{2i}$ i = 2, 3, 4 | |

TABLE 2

Transformation: (Shifting, Rotation in shifted point)

| | Shifting y in mm | Shifting z in mm | Rotation in degrees |
|---|---|---|---|
| t1 | −27.4 | 143.7 | −3.54 |
| t2 | 1.66 | 19.737 | −8.97 |
| t3 | −1.58 | 1.115 | 6.29 |

REFERENCE LIST 10 first assembly group
12 object
14 imager
20 second assembly group
22 optical component
30 third assembly group
32 objective/lens
40 fourth assembly group
42 mirror
50 fifth assembly group
52 illumination optics
54 pupil
56 honeycomb element
200 first region
300 second region
E image
OE optical axis of the image
OX optical axis of the Xth assembly group
VX tilt axis of the Xth assembly group
S beam axis
L variable distance
Z1 object plane
Z2 objective plane
ZE image plane
I rotation
II shifting

What is claimed is:

1. A projection system for imaging an object into an image plane, comprising:
a first assembly group with a first optical axis, comprising the object;
a second assembly group with a second optical axis, comprising an optical component, wherein the second assembly group is an object-side assembly group; and
a third assembly group with a third optical axis, wherein the third assembly group is an image-side assembly group,
wherein the first axis is a continuous common optical axis for the first assembly group, the second axis is a continuous common optical axis for the second assembly group, and the third axis is a continuous common optical axis for the third assembly group,
wherein the third optical axis of the third assembly group is inclined relative to an optical axis of an image in the image plane, and a focusing of the image occurs via a first region situated between any two of the assembly groups, wherein the object is a reflective imager, which is illuminated and imaged by the second assembly group, wherein the second assembly group is tilted and/or decentered relative to the other assembly groups.

2. The projection system of claim 1, further comprising another assembly group including an illumination optic with a pupil, wherein in a section of the pupil a homogenization of the illumination is reached by a honeycomb element.

3. The projection system of claim 1, wherein the optical axes of the tilted assembly groups can be mapped to one another by a rotation of one assembly group of a pair of mutually tilted assembly groups about a tilt axis, wherein the tilt axis belongs to the pair of mutually tilted assembly groups, and by a spatial shift of one assembly group of said pair of mutually tilted assembly groups perpendicularly to the tilt axis, wherein the tilt axis perpendicularly intersects the optical axis of one of the two mutually tilted assembly groups.

4. The projection system of claim 1, wherein the second optical axis of the second assembly group is inclined and/or shifted to the optical axis of the image in the image plane.

5. The projection system of claim 1, wherein the second assembly group comprises exactly one lens element with at least one aspherical surface.

6. The projection system of claim 1, wherein an enlarged image size range can be covered by a second region with variable projection distance, situated between the projection system and the image.

7. The projection system of claim 1, wherein a keystone distortion resulting from the Scheimpflug condition is reduced by at least 10%.

8. The projection system of claim 1, wherein the first region is spaced apart with air between the individual assembly groups.

9. The projection system of claim 8, wherein the first region is located between two assembly groups which are tilted and/or staggered relative to each other.

10. A projection system for imaging an object into an image plane, comprising:
a first assembly group with a first optical axis, comprising the object;
a second assembly group with a second optical axis, comprising an optical component; and
a third assembly group with a third optical axis, wherein the third assembly group is an image-side assembly group,
wherein the first axis is a continuous common optical axis for the first assembly group, the second axis is a continuous common optical axis for the second assembly group, and the third axis is a continuous common optical axis for the third assembly group,
wherein at least any two of the assembly groups are arranged tilted and/or decentered relative to each other, and the third optical axis of the third assembly group is inclined relative to an optical axis of an image in the image plane, and a focusing of the image occurs via a first region situated between any two of the assembly groups, wherein the second assembly group comprises exactly one lens element with at least one aspherical surface.

11. A projection system for imaging an object into an image plane:

a first assembly group with a first optical axis, comprising the object;
a second assembly group with a second optical axis, comprising an optical component; and
a third assembly group with a third optical axis, wherein the third assembly group is an image-side assembly group,
wherein the first axis is a continuous common optical axis for the first assembly group, the second axis is a continuous common optical axis for the second assembly group, and the third axis is a continuous common optical axis for the third assembly group,
wherein at least any two of the assembly groups are arranged tilted and/or decentered relative to each other, and the third optical axis of the third assembly group is inclined relative to an optical axis of an image in the image plane, and a focusing of the image occurs via a first region situated between any two of the assembly groups, wherein an enlarged image size range can be covered by a second region with variable projection distance, situated between the projection system and the image.

* * * * *